(12) United States Patent
Khorrami et al.

(10) Patent No.: US 10,783,248 B2
(45) Date of Patent: Sep. 22, 2020

(54) DETERMINING AN ASPECT OF BEHAVIOR OF AN EMBEDDED DEVICE SUCH AS, FOR EXAMPLE, DETECTING UNAUTHORIZED MODIFICATIONS OF THE CODE AND/OR BEHAVIOR OF AN EMBEDDED DEVICE

(71) Applicant: New York University, New York, NY (US)

(72) Inventors: Farshad Khorrami, Brooklyn, NY (US); Ramesh Karri, New York, NY (US); Prashanth Krishnamurthy, Forest Hills, NY (US)

(73) Assignee: New York University, New York, NY (US)

(*) Notice: Subject to any disclaimer, the term of this patent is extended or adjusted under 35 U.S.C. 154(b) by 204 days.

(21) Appl. No.: 15/874,786

(22) Filed: Jan. 18, 2018

(65) Prior Publication Data
US 2018/0204002 A1 Jul. 19, 2018

Related U.S. Application Data

(60) Provisional application No. 62/447,692, filed on Jan. 18, 2017.

(51) Int. Cl.
*G06F 21/56* (2013.01)
*G06F 11/30* (2006.01)
*G06F 21/55* (2013.01)

(52) U.S. Cl.
CPC ........ *G06F 21/566* (2013.01); *G06F 11/3013* (2013.01); *G06F 11/3058* (2013.01); *G06F 11/3093* (2013.01); *G06F 21/554* (2013.01)

(58) Field of Classification Search
CPC .. G06F 21/566; G06F 11/3013; G06F 21/554; G06F 11/3058; G06F 11/3093
See application file for complete search history.

(56) References Cited

U.S. PATENT DOCUMENTS 8,359,479 B2 * 1/2013 Grinchuk ................ G06F 7/723
708/7
8,996,323 B1 * 3/2015 Morales ............... G01R 31/086
324/527

(Continued)

*Primary Examiner* — Michael Pyzocha
(74) *Attorney, Agent, or Firm* — John C. Pokotylo; Pokotylo Patent Services

(57) ABSTRACT

The goal of detecting modifications, such as unauthorized modifications for example, of the code and/or behavior of an embedded device (e.g., unexpected/unauthorized remote reprogramming, re-flashing), changes to code at run-time (e.g., code injection, software parameter changes due to run-time reconfiguration commands), execution of unauthorized code, activation of hardware Trojans, and other attacks on the hardware and/or software of embedded devices (or more generally, for determining an aspect of behavior of an embedded device and/or an embedded system) is solved by (1) injecting at least one of (A) code and/or (B) inputs into the embedded system to cause the embedded system, when functioning as desired, to exhibit an identifiable baseline behavior determined from a sequence of patterns (also referred to as "fiduciary markers") in observable side channel emissions of the embedded system; (2) measuring side channel emissions generated by the embedded system when the at least one of (A) code and/or (B) inputs is injected; (3) extracting features from the measured side channel emissions; and (4) determining the aspect of the behavior of the embedded system by analyzing the extracted features with respect to features of the baseline behavior.

25 Claims, 6 Drawing Sheets

(56) References Cited

U.S. PATENT DOCUMENTS

| | | | |
|---|---|---|---|
| 9,268,938 B1* | 2/2016 | Aguayo Gonzalez | ................... G01R 21/00 |
| 2012/0331309 A1* | 12/2012 | Scott | ................ G06F 21/755 713/194 |
| 2013/0318607 A1* | 11/2013 | Reed | ............... G06F 11/3062 726/23 |
| 2015/0032752 A1* | 1/2015 | Greifeneder | .......... H04L 41/142 707/738 |
| 2015/0051847 A1* | 2/2015 | Angello | ................ F23N 5/242 702/35 |
| 2015/0091594 A1* | 4/2015 | Hamilton | ................ G01R 1/07 324/750.01 |
| 2015/0317475 A1* | 11/2015 | Aguayo Gonzalez | .. G06F 21/55 726/23 |
| 2016/0098561 A1* | 4/2016 | Keller | ................ G06F 21/554 726/24 |
| 2016/0291552 A1* | 10/2016 | Pal | ................ G05B 13/026 |
| 2018/0027003 A1* | 1/2018 | Bahgat Shehata | ................... G01R 29/0814 726/23 |
| 2019/0197237 A1* | 6/2019 | Aguayo Gonzalez | ................... G01R 31/2893 |

* cited by examiner

DETERMINING AN ASPECT OF BEHAVIOR OF AN EMBEDDED DEVICE SUCH AS, FOR EXAMPLE, DETECTING UNAUTHORIZED MODIFICATIONS OF THE CODE AND/OR BEHAVIOR OF AN EMBEDDED DEVICE

RELATED APPLICATIONS

This application claims the benefit of U.S. Provisional Patent Application Ser. No. 62/447,692 (referred to as "the '692 provisional" and incorporated herein by reference), filed on Jan. 18, 2017, titled "DETERMINING AN ASPECT OF BEHAVIOR OF AN EMBEDDED DEVICE SUCH AS, FOR EXAMPLE, DETECTING UNAUTHORIZED MODIFICATIONS OF THE CODE AND/OR BEHAVIOR OF AN EMBEDDED DEVICE" and listing Farshad Khorrami, Ramesh Karri and Prashanth Krishnamurthy as the inventors. The present invention is not limited to requirements of the particular embodiments described in the '692 provisional.

BACKGROUND OF THE INVENTION

Field of the Invention

The present invention concerns embedded devices and systems including embedded devices, as well as any processor executing instructions including, for example, general purpose computers, embedded microprocessors, and specialized machines running code. More specifically, the present invention concerns determining an aspect of behavior of an embedded system, such as whether or not code of the embedded system has been modified without authorization (e.g., by a cyber attacker).

Background Information

As opposed to a general purpose computer system, an "embedded system" can be thought of as combination of computer hardware and software, and perhaps additional mechanical, electrical, optical, and/or other parts, designed to perform a dedicated function. In some cases, embedded systems are part of a larger system or product, as in the case of an antilock braking system in a car. An embedded system is embedded as part of a complete device often including hardware and mechanical parts.

Modern embedded systems are often based on microcontrollers (e.g., CPUs with integrated memory or peripheral interfaces), but ordinary microprocessors (using external chips for memory and peripheral interface circuits) are also common, especially in more complex systems. In either case, the processor(s) used in embedded systems may be types ranging from general purpose to those specialized or even custom designed for the application at hand.

Embedded systems control many devices in common use today, such as, for example, consumer electronic devices, small and large home appliances, office equipment, automotive electronics, aircraft electronics, railways, telecommunications equipment, medical systems, industrial equipment, smart grid utility systems, etc. As more specific examples, embedded systems are found in digital watches, MP3 players, microwave ovens, mobile phones, calculators, missiles, GPS receivers, heart monitors, laser printers, radar guns, engine controllers, digital cameras, traffic lights, remote controls, bread machines, fax machines, cash registers, treadmills, gas pumps, credit/debit card readers, thermostats, pacemakers, blood gas monitors, grain analyzers, etc.

The complexity of embedded systems can vary from low, with a single microcontroller chip, to very high with multiple units, peripherals and networks mounted in a chassis or enclosure. Compared with their general-purpose counterparts, embedded systems are typically used when low power consumption, small size, rugged operating ranges, and/or low per unit cost are required. Since an embedded system is dedicated to specific tasks, design engineers can optimize it to reduce the size and cost of the product and increase the reliability and performance. Some embedded systems are mass-produced, benefiting from economies of scale. These attributes of embedded systems, however, typically come at the tradeoff of limited processing resources, which pose constraints on the types/sizes of software that they can run and the interaction functionalities that they can provide to a user.

Embedded systems have traditionally been less exposed to cyber attacks than mainstream computer systems, in part due to the proprietary nature of the software that runs on these systems. Additionally, because, historically, many embedded systems have been connected to proprietary networks as opposed to the Internet, they have been less available to cyber attacks. However, this is changing for a number of reasons. First, because security for personal computers is improving, hackers are increasingly looking for "softer" targets. In their sights are the millions of industrial control and coordination devices that use embedded devices and can be programmed like computers. Embedded systems are used in vital parts of our infrastructure, such as in the smart grid used in utility networks, and it is therefore imperative to protect such systems from cyber attack. Second, more devices (e.g., thermostats, remote cameras, home appliances, cars, etc.) have been connected to the Internet (as the so-called "Internet of Things" or "IoT" becomes more widespread), which makes such embedded systems more vulnerable to attack. That is, embedded systems have become numerous enough, networked enough and critical enough to make it profitable for hackers to attack.

In view of the foregoing, it is important to detect modifications, such as unauthorized modifications for example, of the binary code and/or binary behavior of an embedded device (e.g., unexpected/unauthorized remote reprogramming, re-flashing), changes to embedded device code at run-time (e.g., code injection, software parameter changes due to run-time reconfiguration commands), execution of unauthorized code, activation of hardware Trojans, and other attacks on the hardware and/or software of embedded devices.

SUMMARY OF THE INVENTION

The goal of detecting modifications, such as unauthorized modifications for example, of the code and/or behavior of an embedded device (e.g., unexpected/unauthorized remote reprogramming, re-flashing), changes to code at run-time (e.g., code injection, software parameter changes due to run-time reconfiguration commands), execution of unauthorized code, activation of hardware Trojans, and other attacks on the hardware and/or software of embedded devices (or more generally, for determining an aspect of behavior of an embedded device and/or an embedded system) is solved by (1) injecting at least one of (A) code and/or (B) inputs into the embedded system to cause the embedded system, when functioning as desired, to exhibit an identifiable baseline behavior determined from a sequence of patterns (also referred to as "fiduciary markers") in observable side channel emissions of the embedded system; (2) measuring side channel emissions generated by the embedded system when the at least one of (A) code and/or (B)

inputs is injected; (3) extracting features from the measured side channel emissions; and (4) determining the aspect of the behavior of the embedded system by analyzing the extracted features with respect to features of the baseline behavior.

In some example embodiments consistent with the present invention, the aspect of behavior determined is whether the embedded system is functioning as desired. In some example embodiments consistent with the present invention, the aspect of behavior determined is whether code in the embedded system has been subject to an unauthorized modification (e.g., by a cyber attacker).

In some example embodiments consistent with the present invention, code is injected into the embedded system. In some such example embodiments, the injected code and/or inputs are changed dynamically at run-time. In some such example embodiments, the dynamic change of the injected code and/or inputs is according to an unpredictable (e.g., to a cyber attacker) pseudo-random pattern.

In some example embodiments consistent with the present invention, the observable side channel emissions are analog emissions. In some such example embodiments, the analog emissions include at least one of (a) power, (b) thermal, (c) acoustic, (d) vibration, (e) electro-magnetic, (f) visual, (g) odor, and (h) mechanical effects.

In some example embodiments consistent with the present invention, the embedded system consists of at least one embedded device. In other example embodiments, the embedded system includes at least one embedded device and at least one peripheral device. For example, the at least one peripheral device may include (a) sensors, (b) actuators, (c) displays, and/or (d) storage devices.

In some example embodiments consistent with the present invention, determining the aspect of the behavior of the embedded system by analyzing the extracted features with respect to features of the baseline behavior uses at least one of (A) trained machine learning classifier and (B) a statistical analysis module.

Some example embodiments consistent with the present invention may provide an apparatus for determining the aspect of behavior of the embedded system. Such apparatus may include: (1) an injection module configured to inject at least one of (A) code and/or (B) inputs into the embedded system to cause the embedded system, when functioning as desired, to exhibit an identifiable baseline behavior determined from a sequence of patterns in observable side channel emissions of the embedded system; (2) at least one sensor for measuring side channel emissions generated by the embedded system when the at least one of (A) code and/or (B) inputs is injected; (3) a feature extraction module for extracting features from the measured side channel emissions; and (4) an analyzer (also referred to as an "analysis module") adapted to determine the aspect of the behavior of the embedded system by analyzing the extracted features with respect to features of the baseline behavior.

DETAILED DESCRIPTION

The present invention may involve novel methods, apparatus, message formats, and/or data structures for determining an aspect of behavior of an embedded device and/or an embedded system. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown and the inventors regard their invention as any patentable subject matter described.

As used in this application, an "embedded system" is a system that includes at least one embedded device. An embedded system will typically also include one or more peripheral devices.

As understood by those having ordinary skill in the art, as used in this application, a "unit," "component," "element," "module," or "device" may be implemented as circuitry, as an integrated circuits, application specific integrated circuits ("ASICs"), field programmable logic arrays ("FPLAs"), etc., and/or as software (e.g., downloaded and/or stored on a non-transitory storage medium) implemented on a processor, such as a microprocessor for example.

Example Apparatus

Figure 1:
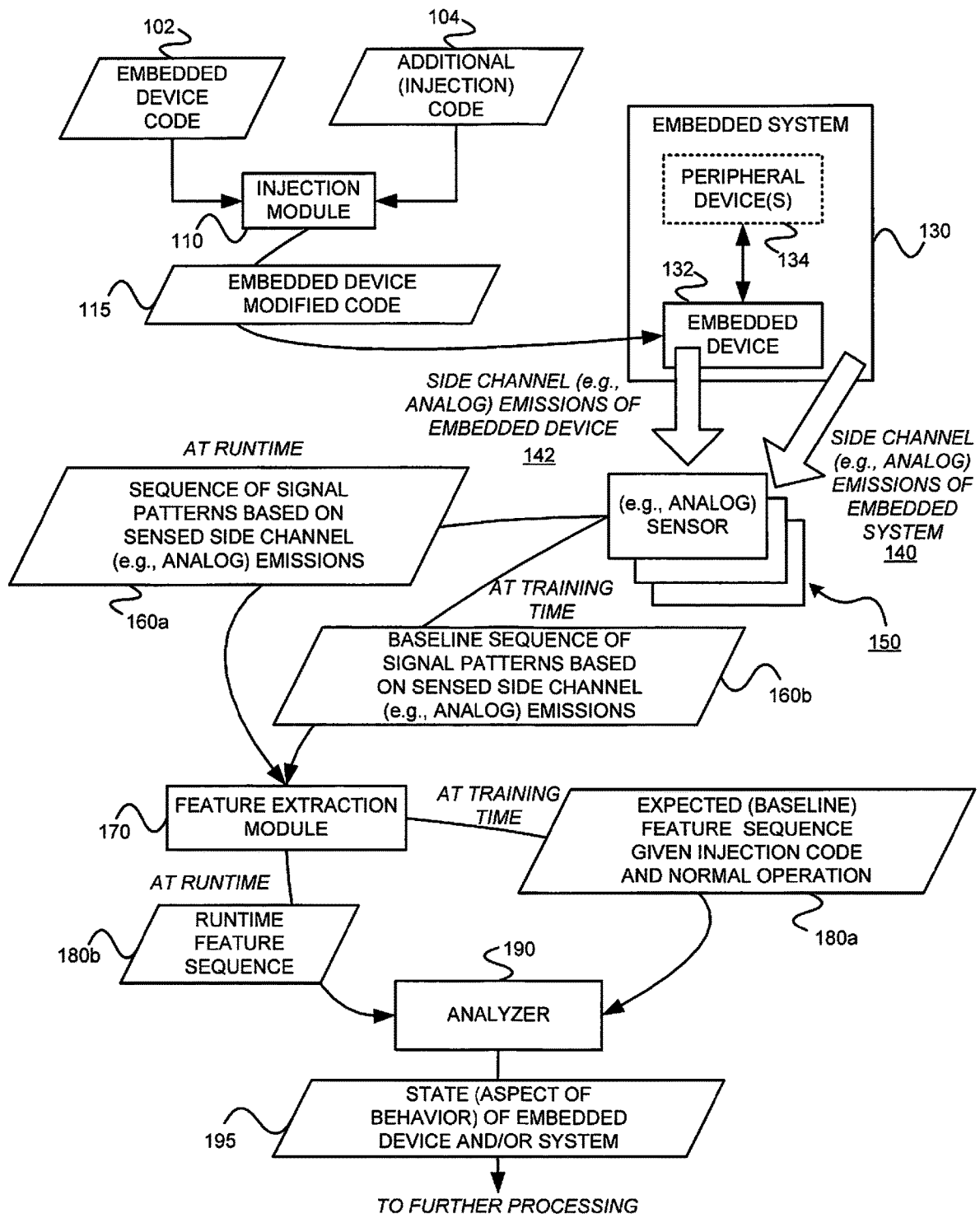
FIG. 1 is a diagram of example apparatus, consistent with the present invention, for determining an aspect of behavior of an embedded device and/or an embedded system.

FIG. 1 is a diagram of example apparatus 100, consistent with the present invention, for determining an aspect of behavior of an embedded device 132 and/or an embedded system 130 including at least one embedded device 132. As shown, the apparatus 100 includes an injection module 110, at least one sensor 150, a feature extraction module 170, and analyzer (or "analysis module") 190.

The injection module 110 is configured to (A) inject additional code 104 into embedded device code 102 to generate embedded device modified code 115, which is then run by the embedded device 132, and/or (B) inject inputs into the embedded device 132 to cause the embedded device 132 (or the embedded system 130 including the embedded device 132 and one or more peripheral devices 134), when functioning as desired, to exhibit an identifiable baseline behavior determined from a sequence of signal patterns in observable side channel emissions of the embedded device 132 (or the embedded system 130). Note that there may be a so-called "air gap" between at least one of the sensors 150 and the embedded device 132 (or the embedded system 130). Example ways to inject code and/or inputs are described in §§ 4.3.1 and 4.3.4 below.

The at least one sensor 150 (such as at least one analog sensor for example) are configured to measure side channel emissions 142 (or 140) generated by the embedded device 132 (or by the embedded system 130) when the at least one of (A) code and/or (B) inputs is injected. Examples of sensors 150 are described in §§ 4.3.2 and 4.3.4 below.

The feature extraction module 170 is configured to extract features from the measured side channel emissions. Collectively, such side channel emissions may be referred to as a sequence of signals based on the sensed side channel emission(s) 160. Such a sequence of signal patterns may be provided at a training time as a baseline 160a, or at a run time 160b.

The analyzer 190 (or "analysis module") is configured to determine the aspect of the behavior of the embedded system 195 by analyzing a sequence of features extracted at runtime 180b with respect to an expected sequence of features of the baseline behavior 180a.

Examples of feature extraction modules 170 and analyzers 190 are described in §§ 4.3.3 and 4.3.4 below.

Example Methods

Figure 2:
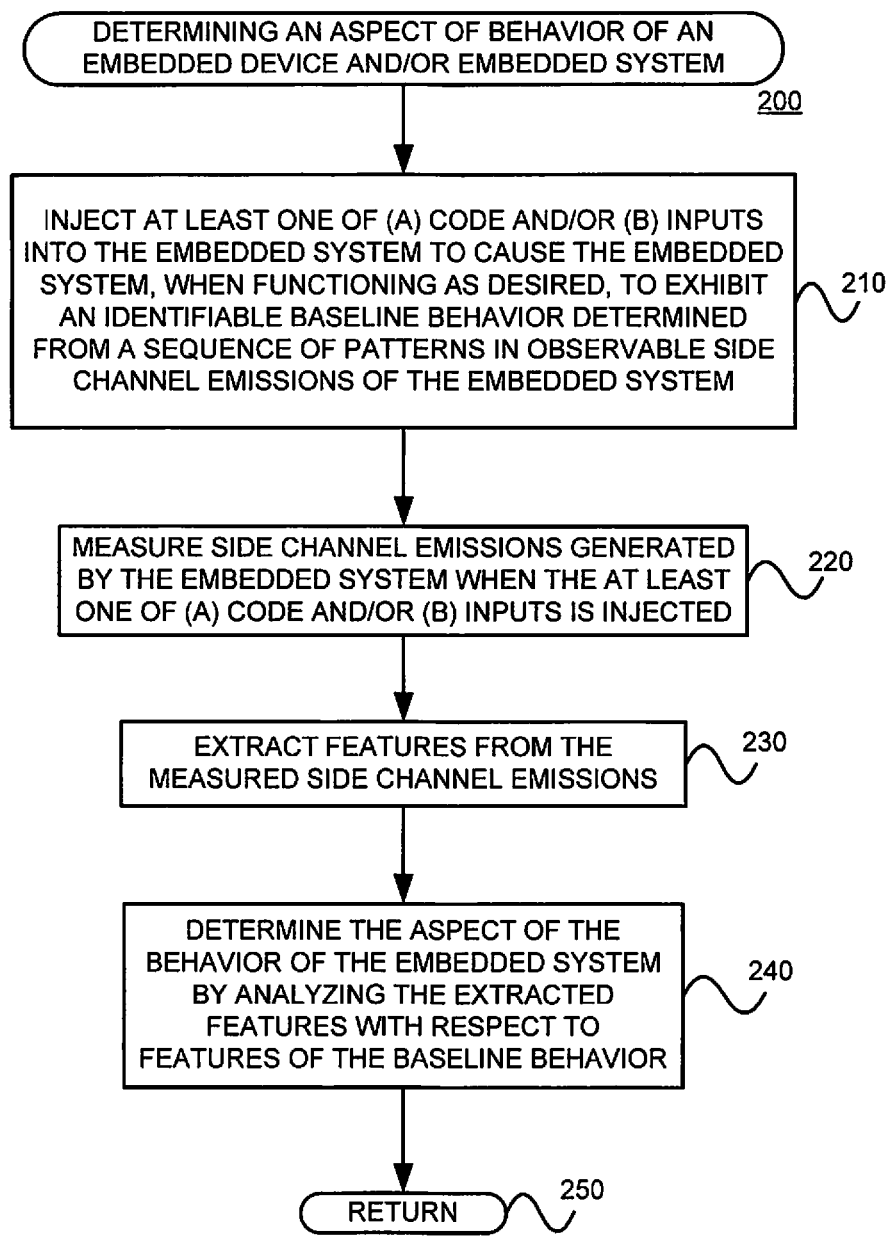
FIG. 2 is a flow diagram of an example method, consistent with the present invention, for determining an aspect of behavior of an embedded device and/or an embedded system.

FIG. 2 is a flow diagram of an example method 200, consistent with the present invention, for determining an aspect of behavior of an embedded device and/or an embedded system. As shown, the example method 200 first injects at least one of (A) code and/or (B) inputs into the embedded system to cause the embedded system, when functioning as desired, to exhibit an identifiable baseline behavior determined from a sequence of patterns in observable side channel emissions of the embedded system. (Block 210) The example method 200 then measures side channel emissions generated by the embedded system when the at least one of (A) code and/or (B) inputs is injected. (Block 220) Then, the example method 200 extracts features from the measured side channel emissions. (Block 230) Referring to both FIGS. 1 and 2, these acts (Blocks 210, 220 and 230) are performed at a training time, to generate an expected (baseline) feature sequence 180a, and at runtime, to generate a feature sequence 180b. Finally, the example method 200 determines the aspect of the behavior of the embedded system by analyzing the extracted features 180b with respect to (expected) features of the baseline behavior 180a. (Block 240)

Refinements, Alternatives and Extensions

As should be appreciated from the foregoing description, example apparatus consistent with the present invention should be "trained," and then used for testing. The training may involve (1) injecting additional code into embedded device code to generate embedded device modified code (See, e.g., 510 of FIG. 5, and 360 of FIG. 3), (2) running the embedded device modified code by the embedded system and/or injecting inputs into the embedded system, (3) detecting/measuring physical responses, over time, to injected code and/or inputs (See, e.g., 310 of FIG. 3, 405 of FIG. 4, and 620 of FIG. 6.), (4) repeating (2) and (3) with the embedded system in different states, and (5) training an analyzer (e.g., a classifier) to classify the state of the embedded system based on the detected/measured physical responses over time (See, e.g., 330 of FIG. 3, and 420 of FIG. 4.). After training is completed, the embedded system may be tested (or more generally analyzed) by (6) running the embedded device modified code by the embedded system (and/or injecting the inputs into the embedded system) (See, e.g., 360 of FIG. 3, and 510 and 520 of FIG. 5.), (7) detecting/measuring physical responses, over time, to the modified code sequence run and/or the inputs injected (See, e.g., 310 of FIG. 3, and 610 and 620 of FIG. 6.), and (8) applying the detected/measured physical responses over time to the analyzer (e.g., a trained classifier) to classify the state of the embedded device (See, e.g., 350, 360 and 370 of FIG. 3, 430 of FIGS. 4, 530 and 540 of FIG. 5, and 630 of FIG. 6.). Each of these parts is described in more detail in §§ 4.3.1-4.3.3 below.

Although the foregoing embodiments were described in the context of embedded devices, example embodiments consistent with the present invention can be extended to as any processor executing instructions including, for example, general purpose computers, embedded microprocessors, and specialized machines running code.

Generating Embedded Device Modified Code to be Run on Base Embedded System and/or Injecting Inputs into "Baseline" Embedded System To generate robust event sequence patterns in a controlled fashion, example embodiments consist with the present invention may use binary code instrumentation techniques to inject specific code blocks that exercise various functionalities (e.g., CPU usage, memory accesses) of the embedded system at specific controlled times. (See, e.g., 510 and 520 of FIG. 5, and 360 of FIG. 3.) Code blocks written to exercise specific system functionalities are injected into the device code at binary or source code levels depending on the available access to the firmware and/or software on a monitored embedded device. The code injection may use techniques such as, for example, Intel's Pin tools, various code trampoline techniques, instrumentation of calls to underlying libraries (e.g., instrumentation around system calls), source code modifications, and/or callback techniques.

The temporal pattern of code injection should be designed both to generate easily discernible event sequences (See, e.g., 340 of FIGS. 3, 405, 410 and 415 of FIG. 4, 530 of FIG. 5, and 610 and 620 of FIG. 6.) and also to facilitate detection of deviations from expected event sequences. In particular, by forming specific temporal patterns (in terms of, for example, inter-event time intervals, event temporal frequencies, variations in event timing, etc.), the event sequence monitoring can be formulated as a dynamic model-based estimation. (See, e.g.: Prasanna Thati and Grigore Roşu, "Monitoring Algorithms for Metric Temporal Logic Specifications," *Electronic Notes in Theoretical Computer Science*, Volume 113, 2005, Pages 145-162; Dejan Nickovic and Oded Maler, "AMT: A Property-Based Monitoring Tool for Analog Systems," *FORMATS* (2007); David A. Basin, Felix Klaedtke, Samuel Müller and Birgit Pfitzmann, "Runtime Monitoring of Metric First-order Temporal Properties," *FSTTCS* (2008); Gabor Simko and Janos Sztipanovits, "Active Monitoring using Real-time Metric Linear Temporal Logic Specifications," *HEALTHINF* (2012); David Basin, Felix Klaedtke, Samuel Muiller, and Eugen Zălinescu, "Monitoring Metric First-Order Temporal Properties," *Journal of the ACM*, vol. 62, no. 2 (May 2015); and Varun Chandola, Arindam Banerjee, and Vipin Kumar, "Anomaly detection: A survey," *ACM Computing Surveys*, vol. 41, no. 3 (July 2009), each of which is incorporated herein by reference.) (See, e.g., 320 of FIG. 3, 530 of FIG. 5 and 620 of FIG. 6.) For example, by utilizing a temporal pattern whose numerical measurements would correspond to a stabilizing control signal for a discrete-time dynamical system, the remote monitoring system can simply compute the state evolution of the dynamical system to detect variations from expected temporal patterns.

Detecting/Measuring Physical Responses, Over Time, to Injected Code Sequence

The considered set of side channel sensory modalities enables remote (e.g., over an "air gap") reading of several physical effects during code execution on a digital device. Power measurements may be used provide aggregate readings reflecting the overall activity of the embedded device. Over a longer time scale, thermal measurements may be used provide readings corresponding to activity of the embedded device. Also, various physical processes in a digital device generate an acoustic signal, although usually not within the human auditory range, including, for example, vibrations of electronic components in the power regulation circuitry in an embedded device. Vibration measurements (using accelerometers for example) provide auxiliary readings that could be relevant, depending on the device characteristics. These side channel sensory modalities might provide somewhat overlapping, but complementary, sources of information on the state of the embedded device. (See, e.g. 310 of FIG. 3, and 405 of FIG. 4.)

Figure 6:
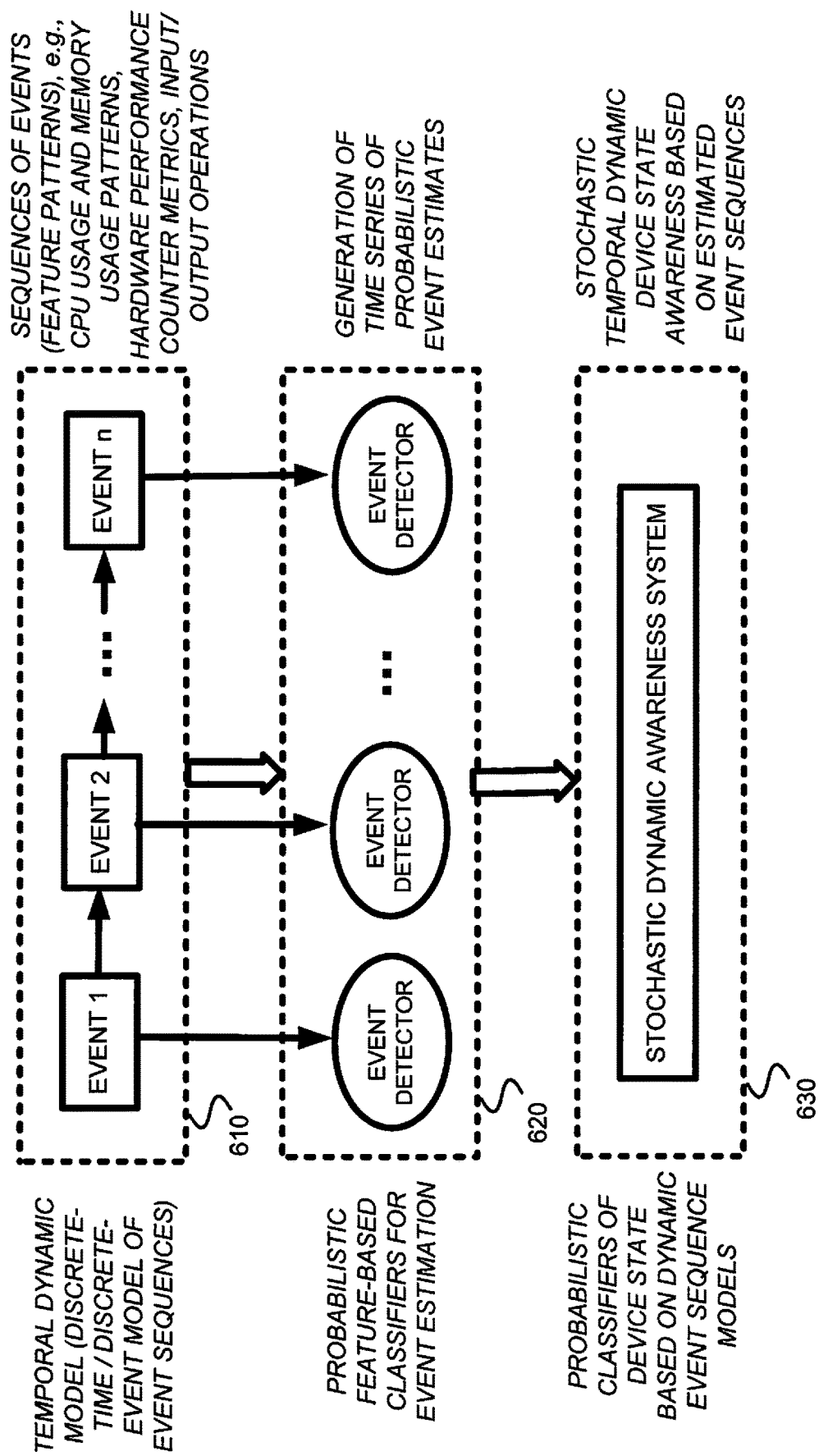
FIG. 6 is a diagram illustrating stochastic dynamic awareness, in a manner consistent with the present invention, of the state of an embedded device based on event sequence estimation.

Training Classifier to Classify State of the Embedded System Based on the Detected/Measured Physical Responses Over Time An example system consistent with the present invention may use multiple layers of temporal aggregation based on, firstly, machine learning algorithms to probabilistically detect low-dimensional feature representations (as events) from time windows of sensor data, and secondly, multi-time-scale probabilistic state awareness algorithms to estimate device state based on detected event sequences using probabilistic feature-based clustering and dynamic model based techniques. (See, e.g., FIG. 4. See also: Christopher Bishop, *Pattern Recognition and Machine Learning*, (Springer-Verlag, New York, 2006); Isabelle Guyon, Steve Gunn, Masoud Nikravesh, and Lotfi A. Zadeh (editors), *Feature Extraction: Foundations and Applications, Studies in Fuzziness and Soft Computing*, (Springer-Verlag New York, 2006); Gustavo Camp-Valls and Lorenzo Bruzzone (editors), *Kernel Methods for Remote Sensing Data Analysis*, (Wiley, 2009); and Trevor Hastie, Robert Tibshirani, and Jerome Friedman, *The Elements of Statistical Learning: Data Mining, Inference, and Prediction*, (Springer-Verlag New York, 2009), each of which is incorporated herein by reference.) (See, also, e.g.: Prasanna Thati and Grigore Roşu, "Monitoring Algorithms for Metric Temporal Logic Specifications," *Electronic Notes in Theoretical Computer Science*, Volume 113, 2005, Pages 145-162; Dejan Nickovic and Oded Maler, "AMT: A Property-Based Monitoring Tool for Analog Systems," *FORMATS* (2007); David A. Basin, Felix Klaedtke, Samuel Müller and Birgit Pfitzmann, "Runtime Monitoring of Metric First-order Temporal Properties," *FSTTCS* (2008); Gabor Simko and Janos Sztipanovits, "Active Monitoring using Real-time Metric Linear Temporal Logic Specifications," *HEALTHINF* (2012); David Basin, Felix Klaedtke, Samuel Müller, and Eugen Zălinescu, "Monitoring Metric First-Order Temporal Properties," *Journal of the ACM*, vol. 62, no. 2 (May 2015); and Varun Chandola, Arindam Banerjee, and Vipin Kumar, "Anomaly detection: A survey," *ACM Computing Surveys*, vol. 41, no. 3 (July 2009), each of which is incorporated herein by reference.) FIG. 6 is a diagram illustrating stochastic dynamic awareness (See, e.g., 630.), in a manner consistent with the present invention, of the state of an embedded device based on event sequence estimation.

The events 610 may include, for example, hardware performance counter ("HPC") signatures, memory access patterns, dynamically generated control flow graphs, resource usages including CPU, memory, and GPU usages, input and output events, and/or power modes. Events may be combined to characterize the temporal behavior of the device. Events may be probabilistically detected (See, e.g., 620.) from measured side channel signals using a machine learning based classifier (See, e.g., 630.) that is trained utilizing data sets collected during device operation in combination with, in general, auxiliary data on the device characteristics and run-time behavior.

Figure 3:
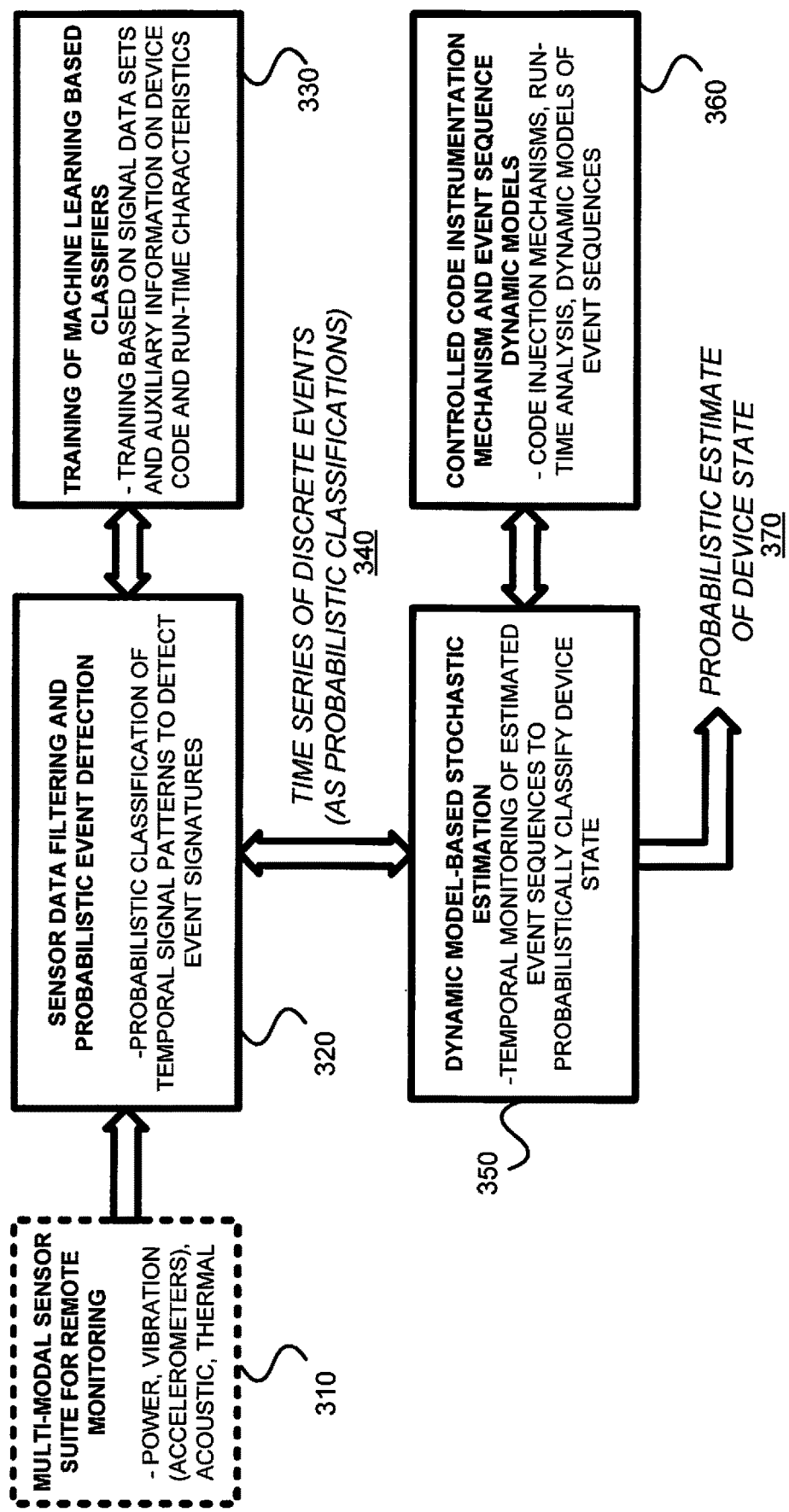
FIG. 3 is a diagram of an example architecture of a system for device monitoring based on remote, multi-modal analog sensing, consistent with the present invention.
Figure 4:
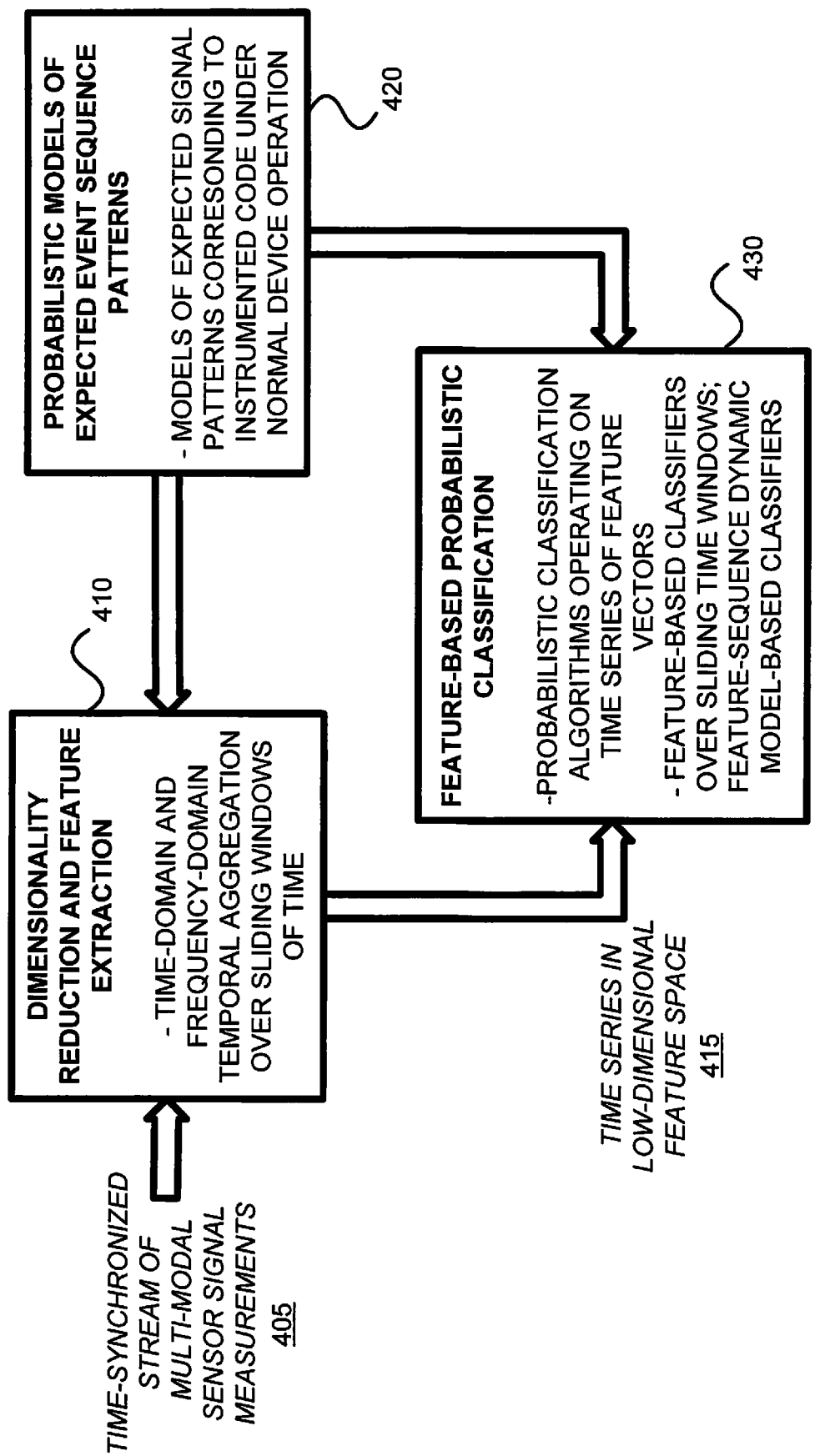
FIG. 4 is a diagram of an example architecture for using instrumenting code to remotely and autonomously monitory an embedded device and/or an embedded system, consistent with the present invention.
Figure 5:
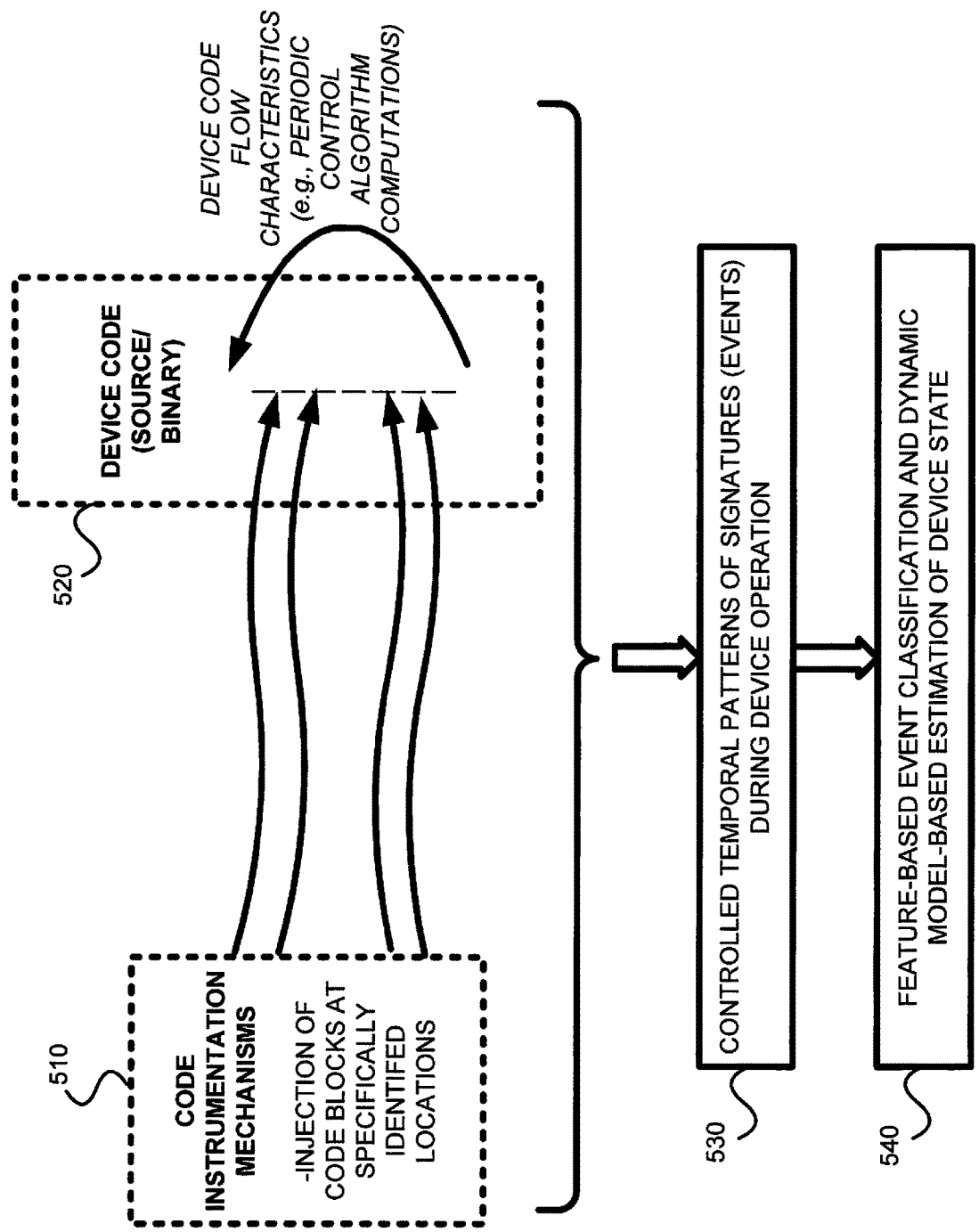
FIG. 5 is a block diagram of example apparatus for providing robust monitoring of embedded processors via code instrumentation with probabilistic event sequence detection consistent with the present invention.

More generally, a discrete-time/discrete-event behavioral model may be used to probabilistically characterize event sequence patterns (See, e.g., 320 and 340 of FIG. 3, 430 of FIG. 4, 530 of FIG. 5 and 620 of FIG. 6.) and classify device states (See, e.g., 350 and 370 of FIG. 3, 430 of FIG. 4, 540 of FIG. 5 and 630 of FIG. 6.). This code instrumentation (See 510 and 520.) based conceptual framework to facilitate robust monitoring is illustrated in FIG. 5.

Example embodiments consistent with the present invention may fuse these multiple information streams in real-time to generate a probabilistic awareness of the embedded device state including the embedded device characteristics and operating conditions and code modifications.

Such a multi-time-scale approach intrinsically enables a deeper physical understanding of the dynamic device state as compared to a simple windowing of sensor data with the target device modeled simply as a black box and provides robustness to run-time temporal variations and non-determinacy.

§ 4.3.4 ICE CReAM: Instrumenting Code for Embedded Controlled Remote Autonomous Monitoring ICE CReAM is one example system, consistent with the present invention, for monitoring an embedded processor using various side channels to detect signal signature patterns (See, e.g., 310 of FIG. 3 and 530 of FIG. 5.) that are designed, in a controlled fashion, by instrumenting the binaries (See 360 of FIG. 3, 420 of FIG. 4, and 510 and 520 of FIG. 5.). ICE CReAM enables detection of modifications of the binary code/behavior of a device (e.g., unexpected/unauthorized remote reprogramming, re-flashing), changes to code at run-time (e.g., code injection, software parameter changes due to run-time reconfiguration commands), execution of unauthorized code, activation of hardware Trojans, and other hardware/software attacks. For this purpose, ICE CReAM utilizes a multi-modal set of sensors (including power, EMI, acoustic, and possibly thermal) for side channel monitoring of devices. (See, e.g., 310 of FIG. 3, and 405 of FIG. 4.) Using code injection methods, robustly discernible and trackable signatures are embedded into the run-time side channel signal characteristics of the device. Machine learning based probabilistic classifiers are trained to detect keyed signatures that drastically change under attack in the side channel signals during run-time (See, e.g., 320 and 340 of FIG. 3, 430 of FIG. 4, 530 of FIG. 5, and 620 of FIG. 6.) and a dynamic model-based estimator is used to probabilistically detect the device state (i.e., modified vs. unmodified states and more generally, classify among a set of device states) (See, e.g., 350 and 370 of FIG. 3, 430 of FIG. 4, 540 of FIG. 5 and 630 of FIG. 6.).

The overall structure of ICE CReAM is illustrated in FIG. 3. ICE CReAM is based on multi-modal side channel sensing (310), binary instrumentation techniques (360) for controlled modifications of sensor signal patterns to generate robustly discernible feature signatures (320/340), and advanced data fusion and probabilistic classification algorithms to offer a detailed and accurate awareness of the device state (350/370) in real time based on probabilistic matching between expected and observed sequences of feature signatures during device operation.

FIG. 4 illustrates an algorithmic approach of ICE CReAM. This algorithmic approach is based on a multi-time-scale dynamic formulation of events characterized by feature patterns. For dynamic awareness of the device being monitored using side channels, the system utilizes multiple layers of temporal aggregation based on, firstly, machine learning algorithms to probabilistically detect low-dimensional feature representations (as events) from time windows of sensor data (410) and, secondly, multi-time-scale probabilistic state awareness algorithms to estimate device state based on detected event sequences using probabilistic feature-based clustering and dynamic model based techniques. (See, e.g.: Christopher Bishop, *Pattern Recognition and Machine Learning*, (Springer-Verlag, New York, 2006); Isabelle Guyon, Steve Gunn, Masoud Nikravesh, and Lotfi A. Zadeh (editors), *Feature Extraction: Foundations and Applications, Studies in Fuzziness and Soft Computing*, (Springer-Verlag New York, 2006); Gustavo Camp-Valls and Lorenzo Bruzzone (editors), *Kernel Methods for Remote Sensing Data Analysis*, (Wiley, 2009); and Trevor Hastie, Robert Tibshirani, and Jerome Friedman, *The Elements of Statistical Learning: Data Mining, Inference, and Prediction*, (Springer-Verlag New York, 2009), each of which is incorporated herein by reference.) (See, also, e.g.: Prasanna Thati and Grigore Roşu, "Monitoring Algorithms for Metric Temporal Logic Specifications," *Electronic Notes in Theoretical Computer Science*, Volume 113, 2005, Pages 145-162; Dejan Nickovic and Oded Maler, "AMT: A Property-Based Monitoring Tool for Analog Systems," *FORMATS* (2007); David A. Basin, Felix Klaedtke, Samuel Müller and Birgit Pfitzmann, "Runtime Monitoring of Metric First-order Temporal Properties," *FSTTCS* (2008); Gabor Simko and Janos Sztipanovits, "Active Monitoring using Real-time Metric Linear Temporal Logic Specifications," *HEALTH-INF* (2012); David Basin, Felix Klaedtke, Samuel Müller, and Eugen Zălinescu, "Monitoring Metric First-Order Temporal Properties," *Journal of the ACM*, vol. 62, no. 2 (May 2015); and Varun Chandola, Arindam Banerjee, and Vipin Kumar, "Anomaly detection: A survey," *ACM Computing Surveys*, vol. 41, no. 3 (July 2009), each of which is incorporated herein by reference.) This multi-time-scale approach intrinsically enables a deeper physical understanding of the dynamic device state as compared to a simple windowing of sensor data with the target device modeled simply as a black box and provides robustness to run-time temporal variations and non-determinacy. Various events, including hardware performance counter ("HPC") signatures, memory access patterns, dynamically generated control flow graphs, resource usages including CPU, memory, and GPU usages, input and output events, and power modes, are combined to characterize the temporal behavior of the device. These events are probabilistically detected from measured side channel signals using a machine learning based classifier that is trained utilizing data sets collected during device operation in combination with, in general, auxiliary data on the device characteristics and run-time behavior.

To generate robust event sequence patterns in a controlled fashion, ICE CReAM utilizes binary code instrumentation techniques to inject specific code blocks that exercise various system functionalities (e.g., CPU usage, memory accesses) at specific controlled times. (See, e.g., 510 and 520 of FIG. 5.) Code blocks written to exercise specific system functionalities are injected into the device code at binary or source code levels (See, e.g., 510 and 520 of FIG. 5.) depending on the available access to the firmware/software on a monitored device. The code injection utilizes techniques such as Intel's Pin tools, various code trampoline techniques, instrumentation of calls to underlying libraries (e.g., instrumentation around system calls), source code modifications, and callback techniques. The temporal pattern of code injection is designed both to generate easily discernible event sequences and also to facilitate detection of deviations from expected event sequences. (See 530) In particular, by forming specific temporal patterns (in terms of, for example, inter-event time intervals, event temporal frequencies, variations in event timing, etc.), the event sequence monitoring can be formulated as a dynamic model-based estimation. For example, by utilizing a temporal pattern whose numerical measurements would correspond to a stabilizing control signal for a discrete-time dynamical system, the remote monitoring system can simply compute the state evolution of the dynamical system to detect variations from expected temporal patterns. In more generality, a discrete-time/discrete-event behavioral model is utilized to probabilistically characterize event sequence patterns (530/610/620.) and classify device states (540/630.). This code instrumentation (See 510) based conceptual framework to facilitate robust monitoring is illustrated in FIG. 5.

The considered set of side channel sensory modalities enables remote reading of several physical effects during code execution on a digital device. Power measurements provide aggregate readings reflecting the overall activity of the device. Over a longer time scale, thermal measurements provide readings corresponding to device activity. Also, various physical processes in a digital device generate an acoustic signal, although usually not within the human auditory range, including, for example, vibrations of electronic components in the power regulation circuitry in a device. Vibration measurements (using accelerometers for example) provide auxiliary readings that could be relevant, depending on the device characteristics. These side channel sensory modalities provide somewhat overlapping, but complementary, sources of information on the state of the device. ICE CReAM fuses these multiple information streams in real-time to generate a probabilistic awareness of the device state including the device characteristics and operating conditions and code modifications.

ICE CReAM may be applied to various embedded devices. The code instrumentation for the programmable logic controller ("PLC") may consider modifications of the text-based PLC code and possibly firmware modifications. The code instrumentation for a software program running on a desktop computer will consider modifications to the binaries and source code and instrumentation of underlying system libraries.

CONCLUSIONS

The foregoing methods and apparatus can detect modifications, such as unauthorized modifications for example, of the binary code and/or binary behavior of an embedded device or an embedded system (e.g., unexpected/unauthorized remote reprogramming, re-flashing), changes to code at run-time (e.g., code injection, software parameter changes due to run-time reconfiguration commands), execution of unauthorized code, activation of hardware Trojans, and other hardware/software attacks (or more generally, can determine an aspect of behavior of an embedded device and/or an embedded system).

What is claimed is:

1. A computer-implemented method for determining an aspect of behavior of an embedded system, the method comprising:
   a) injecting at least one of (A) code and/or (B) inputs into the embedded system to cause the embedded system, when functioning as desired, to exhibit an identifiable baseline behavior determined from a sequence of patterns in observable side channel emissions of the embedded system;
   b) measuring side channel emissions generated by the embedded system when the at least one of (A) code and/or (B) inputs is injected;
   c) extracting features from the measured side channel emissions; and
   d) determining the aspect of the behavior of the embedded system by analyzing the extracted features with respect to features of the baseline behavior,
      wherein the injected code and/or inputs are changed dynamically at run-time.

2. The computer-implemented method of claim 1 wherein the dynamic change of the injected code and/or inputs is according to an unpredictable pseudo-random pattern.

3. The computer-implemented method of claim 1 wherein the observable side channel emissions are analog emissions.

4. The computer-implemented method of claim 3 wherein the analog emissions include at least one of (a) power, (b) thermal, (c) acoustic, (d) vibration, (e) electro-magnetic, (f) visual, (g) odor, and (h) mechanical effects.

5. The computer-implemented method of claim 1 wherein the embedded system consists of at least one embedded device.

6. The computer-implemented method of claim 1 wherein the embedded system includes at least one embedded device and at least one peripheral device.

7. The computer-implemented method of claim 6 wherein the at least one peripheral device is selected from a group of devices consisting of (a) sensors, (b) actuators, (c) displays, and (d) storage devices.

8. The computer-implemented method of claim 1 wherein determining the aspect of the behavior of the embedded system by analyzing the extracted features with respect to features of the baseline behavior uses at least one of a trained machine learning classifier and statistical analysis.

9. The computer-implemented method of claim 1 wherein the embedded system includes at least one of a general purpose computer, an embedded microprocessor, or a specialized machine running code.

10. The computer-implemented method of claim 1 wherein the act of injecting at least one of (A) code and/or (B) inputs into the embedded system to cause the embedded system, when functioning as desired, to exhibit an identifiable baseline behavior determined from a sequence of patterns in observable side channel emissions of the embedded system includes injecting code in a temporal pattern designed to generate discernable event sequences.

11. The computer-implemented method of claim 1 wherein the aspect of behavior determined is whether the embedded system is functioning as desired.

12. The computer-implemented method of claim 1 wherein the aspect of behavior determined is whether code in the embedded system has been subject to an unauthorized modification.

13. The computer-implemented method of claim 1 wherein code is injected into the embedded system.

14. Apparatus for determining an aspect of behavior of an embedded system, the apparatus comprising:
   a) an injection module configured to inject at least one of (A) code and/or (B) inputs into the embedded system to cause the embedded system, when functioning as desired, to exhibit an identifiable baseline behavior determined from a sequence of patterns in observable side channel emissions of the embedded system;
   b) at least one sensor for measuring side channel emissions generated by the embedded system when the at least one of (A) code and/or (B) inputs is injected;
   c) a feature extraction module for extracting features from the measured side channel emissions; and
   d) an analyzer adapted to determine the aspect of the behavior of the embedded system by analyzing the extracted features with respect to features of the baseline behavior,
      wherein injection module changes the injected code and/or inputs dynamically at run-time.

15. The apparatus of claim 14 wherein the dynamic change of the injected code and/or inputs by the injection module is according to an unpredictable pseudo-random pattern.

16. The apparatus of claim 14 wherein the observable side channel emissions are analog emissions and the at least one sensor is an analog sensor.

17. The apparatus of claim 16 wherein the analog emissions include at least one of (a) power, (b) thermal, (c) acoustic, (d) vibration, (e) electro-magnetic, (f) visual, (g) odor, and (h) mechanical effects.

18. The apparatus of claim 14 wherein the embedded system consists of at least one embedded device.

19. The apparatus of claim 14 wherein the embedded system includes at least one embedded device and at least one peripheral device.

20. The apparatus of claim 19 wherein the at least one peripheral device is selected from a group of devices consisting of (a) sensors, (b) actuators, (c) displays, and (d) storage devices.

21. The apparatus of claim 14 wherein the analyzer is least one of a trained machine learning classifier and a statistical analyzer.

22. The apparatus of claim 14 wherein the embedded system includes at least one of a general purpose computer, an embedded microprocessor, or a specialized machine running code.

23. The apparatus of claim 14 wherein the aspect of behavior determined is whether the embedded system is functioning as desired.

24. The apparatus of claim 14 wherein the aspect of behavior determined is whether code in the embedded system has been subject to an unauthorized modification.

25. The apparatus of claim 14 wherein the injection module injects code into the embedded system.

* * * * *